United States Patent [19]

Craft et al.

[11] Patent Number: 4,714,871
[45] Date of Patent: Dec. 22, 1987

[54] LEVEL SHIFTER FOR A POWER SUPPLY REGULATOR IN A TELEVISION APPARATUS

[75] Inventors: Jack Craft, Bridgewater; Michael L. Low, Dover; Bernard J. Yorkanis, S. Plainfield, all of N.J.

[73] Assignee: RCA Corporation, Princeton, N.J.

[21] Appl. No.: 943,187

[22] Filed: Dec. 18, 1986

[51] Int. Cl.[4] .......................................... G05F 3/20
[52] U.S. Cl. ................................. 323/315; 315/411; 323/282
[58] Field of Search ................ 323/282, 284, 315–317; 315/411; 358/190; 363/21

[56] References Cited

U.S. PATENT DOCUMENTS

| | | | |
|---|---|---|---|
| 3,814,851 | 6/1974 | Nakagawa et al. | 358/190 |
| 4,221,979 | 9/1980 | Ahmed | 307/255 |
| 4,292,654 | 9/1981 | Steckler et al. | 315/411 X |
| 4,387,399 | 6/1983 | Novotny | 315/411 X |
| 4,580,090 | 4/1986 | Bailey et al. | 323/282 X |
| 4,595,977 | 6/1986 | von der Ohe | 363/21 X |
| 4,607,249 | 8/1986 | Naylor | 340/347 DA |
| 4,629,913 | 12/1986 | Lechner | 323/316 X |

OTHER PUBLICATIONS

Data sheet for a linear integrated circuit CA3210E and CA3223E of the RCA Corporation, published May 1982, entitled TV Horizontal/Vertical Countdown Digital Sync System.

An article entitled A Simple Three-Terminal IC Bandgap Reference, in the name of A. P. Brokaw, reprinted from IEEE J. Solid-State Circuits, vol. SC9, pp. 388–393, Dec. 1974.

An article entitled New Developments in IC Voltage Regulators published in IEEE Journal of Solid-State Circuits, vol. SC-6, No. 1, Feb. 1971, in the name of R. J. Widlar.

Primary Examiner—Peter S. Wong
Assistant Examiner—Marc S. Hoff
Attorney, Agent, or Firm—Eugene M. Whitacre; Joseph J. Laks; Sammy S. Henig

[57] ABSTRACT

A level shifter receives a variable input voltage such as a beam current representative voltage of a cathode ray tube and produces an output voltage that changes when the input voltage changes such that the output voltage is level shifted relative to the input voltage. The output voltage is coupled to an input terminal of an error amplifier of a power supply voltage regulator of a television receiver. The level shifter includes a current mirror arrangement responsive to the input voltage. A band gap type voltage source determines the amount of level shifting that is produced by the level shifter.

19 Claims, 6 Drawing Figures

LEVEL SHIFTER FOR A POWER SUPPLY REGULATOR IN A TELEVISION APPARATUS

The invention relates to an amplifier stage arrangement that combines an input signal with a reference signal to produce an output signal that is level shifted relative to that of the input signal. In particular, the invention relates to a level shifter used in an input stage of a power supply regulator of a television apparatus.

In a power supply arrangement of, for example, a television receiver, a voltage representative of a DC, regulated supply voltage B+ is coupled to, for example, an inverting input terminal of an input stage of a voltage regulator that regulates voltage B+. A reference voltage is coupled to, for example, a noninverting input terminal of the regulator. The feed-back voltage that is representative, for example, of regulated supply voltage B+ is compared, in the input stage, with the reference voltage to generate an output voltage that is coupled to a controllable arrangement. The controllable arrangement establishes voltage B+ at a level that is determined by the reference voltage. Voltage B+ may be used, for example, to energize a deflection circuit output stage of a cathode ray tube (CRT).

In one prior art circuit, a voltage representative of, for example, a level of the beam current in the CRT is summed with the reference voltage, such that the sum of both, instead of the reference voltage alone, is applied to the noninverting input terminal of the input stage. A variation of the beam current representative voltage varies voltage B+ so as to maintain the raster width in the CRT constant when the beam current changes.

The summation of the constant reference voltage and the variable beam current representative voltage is done, in such prior art circuit, by coupling the beam current representative voltage, via a zener diode to the noninverting input terminal. The zener diode develops between its anode and cathode electrodes the reference voltage. Thus, the reference voltage that level shifts the beam current representative voltage is series coupled with the beam current representative voltage.

A disadvantage of such level shifting arrangement that is accomplished by the zener diode is that a change in the zener voltage due to temperature, aging or an inherent noise in the zener diode, disadvantageously, causes voltage B+ to change.

It may be desirable to sum the beam current representative voltage with a reference voltage to generate a sum voltage that is applied to the noninverting input terminal of the input stage without using such zener diode.

In an embodiment of the invention, the reference voltage is produced by a voltage source of, for example, the well known bandgap type. The beam current representative voltage is summed with, or level shifted by, the reference voltage that is produced by the bandgap type source. Advantageously, the bandgap type source is less susceptible than the zener diode to temperature changes, components aging or noise.

In a circuit embodying an aspect of the invention, an input signal, such as the beam current representative voltage, is coupled in series with an emitter electrode of a first transistor that operates as a common base amplifier. A second transistor, operating as a current source, and having its collector coupled to the collector of the first transistor, supplies the collector current of the first transistor. A current mirror arrangement, that includes the first transistor, causes the collector current in the first transistor to be equal to that supplied by the collector current of the second transistor, when the input signal is at a predetermined magnitude such as zero. A first voltage, such as produced by a bandgap type source, is coupled via a resistor to a junction terminal between the collectors of the first and second transistors. The collector currents of the first and second transistors produce a difference current that develops a voltage across the resistor that is summed with the first voltage to produce a second signal that is developed at the junction terminal. The second signal is at a magnitude that is determined by the first voltage and not by the collector currents in any of the first and second transistors, when the magnitude of the input signal is predetermined such as zero. When the magnitude of the input signal is different from the predetermined magnitude, the second signal is different from the first voltage by an amount that is proportional to the magnitude of the input signal.

In accordance with an aspect of the invention, a power supply includes a level shifter level that shifts an input voltage used for controlling an output supply voltage of the power supply. A controllable conductive element is coupled to the input supply voltage for generating, from the input supply voltage, the output supply voltage. The power supply includes a comparator, coupled to the conductive element, for varying, in accordance with an output signal of the comparator, the conduction of the conductive element to control the output supply voltage. A current mirror arrangement that includes a transistor is responsive to a current in a first circuit branch for generating in a first main current conducting electrode of the transistor a current that is the current mirror of the current in the first circuit branch. The first main current conducting electrode is coupled at a junction terminal to a second circuit branch for conducting at least a portion of a current in the second circuit branch. A source of the input voltage is coupled to the transistor for varying the current in the first main current conducting electrode to produce a difference related current that varies in accordance with the input voltage. The difference current is related to a difference between the current in the first main current conducting electrode and the current in the second circuit branch. A first resistance is coupled to the junction terminal for conducting the difference related current to develop a voltage across the resistance that varies in accordance with the input voltage. A source of temperature compensated first voltage is coupled via the resistance to the junction terminal such that the voltage across the resistance is combined with the first voltage for developing a temperature compensated second voltage at the junction terminal. The second voltage varies in accordance with the input voltage. The second voltage is level shifted in accordance with the first voltage. The temperature compensated, level shifted, second voltage is coupled to an input of the comparator for varying the output signal of the comparator to control the output supply voltage.

FIG. 1 illustrates a simplified schematic diagram of a power supply of a television receiver, not shown in the FIGURES, that includes a regulator 100 that is an integrated circuit that regulates a supply voltage B+. Voltage B+ may be used, for example, to energize a horizontal deflection circuit or output stage 99 of the television receiver.

Figure 1:
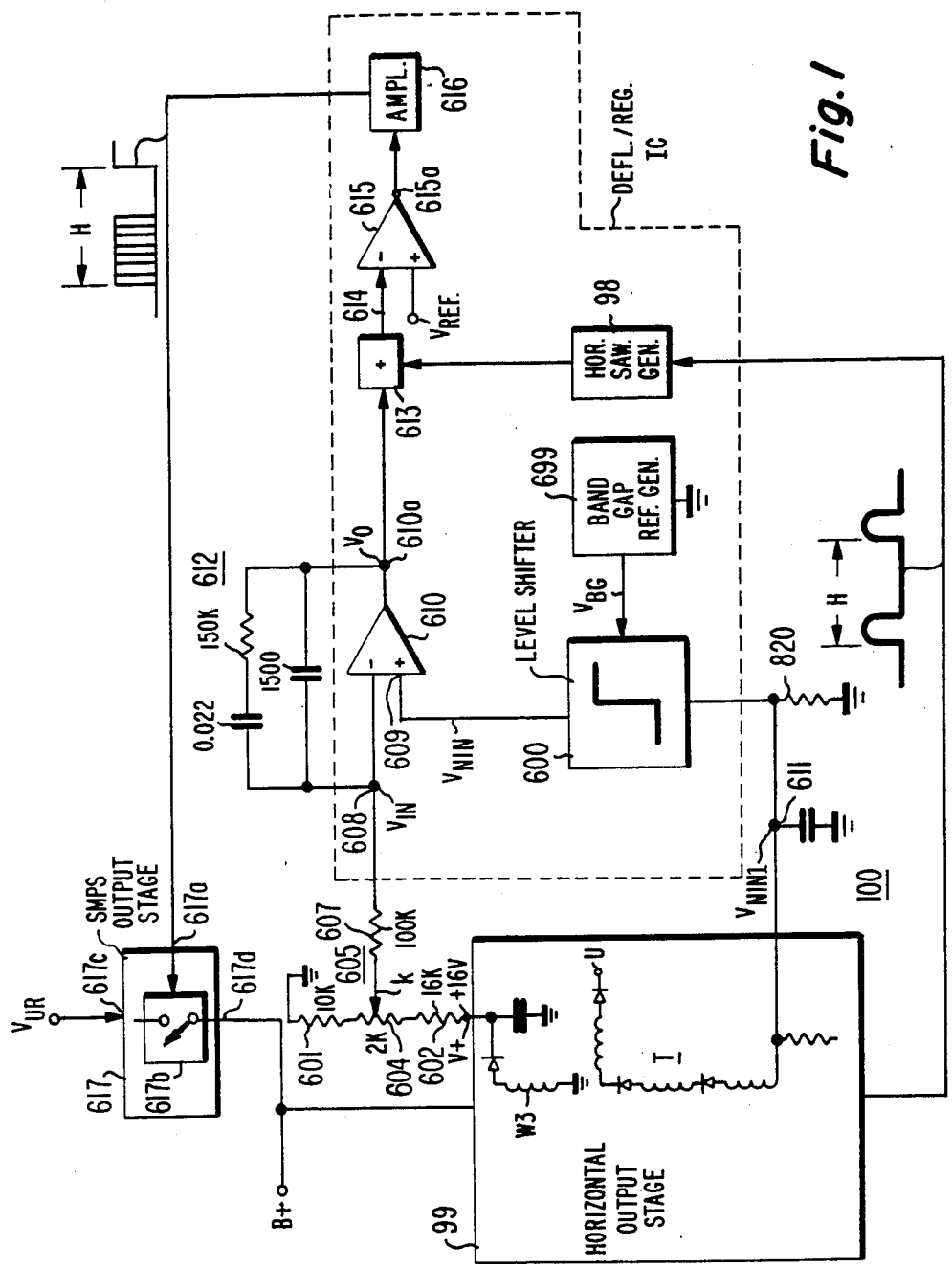
FIG. 1 illustrates a simplified schematic diagram of a power supply regulator circuit that includes a level shifter, embodying an aspect of the invention.

A voltage V+, representative of voltage B+, is obtained by rectifying a retrace voltage that is developed across a winding W3 of a flyback transformer T of output stage 99. Voltage V+ is coupled to a voltage divider 605 that includes series coupled resistors 601, 604 and 602. Resistor 604 includes a wiper k for developing at wiper k a voltage that is representative of, for example, voltage B+. The voltage at wiper k, that is adjustable by varying the position of wiper k, is coupled to an inverting input terminal 608 of an error amplifier 610 via a resistor 607.

A small voltage that is proportional to the beam current in the CRT of the receiver, that is not shown in the FIGURES, is coupled from a tertiary winding of transformer T to a terminal 611 to form a voltage $V_{NIN1}$ that is indicative of the beam current representative voltage.

Voltage $V_{NIN1}$ that varies when a variation of the beam current occurs, is coupled via a level shifter 600, embodying an aspect of the invention, to a noninverting input terminal 609 of error amplifier 610 to produce an input voltage $V_{NIN}$. Level shifter 600 establishes a fixed offset voltage between terminals 611 and 608 that is determined by a voltage $V_{BG}$. Voltage $V_{BG}$ is generated in a bandgap type voltage source 699. Bandgap type voltage source 699, advantageously, maintains voltage $V_{BG}$ constant when a temperature change occurs such that voltage $V_{BG}$ is affected significantly less by components aging or tolerances than would have occurred had a zener diode been used. As explained later on, in operation, the feed back arrangement of regulator 100 causes voltage B+ to be such that voltage $V_{IN}$ becomes equal to voltage $V_{NIN}$.

An integrating filter 612 is coupled between inverting input terminal 608 and an output terminal 610a of amplifier 610 to provide the loop filter of regulator 100. A filtered, error voltage $V_0$, developed at terminal 610a, is coupled to a first input terminal of an adder 613. A horizontal sawtooth generator 98 develops a horizontal rate signal, having an upramping portion, is added to error voltage $V_0$ in adder 613. The sum signal, a signal 614, that is also upramping, is applied to an inverting input terminal of a comparator 615 functioning as a pulse width modulator.

When, during its upramping portion, signal 614 becomes more positive than a constant DC voltage $V_{REF}$, that is coupled to a noninverting input terminal of comparator 615, a negative going transition at an output terminal 615a of comparator 615 is coupled via a buffer amplifier 616 to a control terminal 617a of a switch 617b of a switch mode power supply output stage 617 to turn on switch 617b of output stage 617.

An input terminal 617c of output stage 617 is coupled to unregulated voltage $V_{UR}$. Regulated voltage B+ is developed at an output terminal 617d of output stage 617.

The duration, during each horizontal period, H, in which switch 617b conducts is determined by the level of error voltage $V_0$ of error amplifier 610. Thus, regulated voltage B+ is determined by voltage $V_{NIN}$. As indicated before, voltage $V_{NIN}$ is produced by level shifter 600, embodying an aspect of the invention, that is described now in detail.

Figure 2:
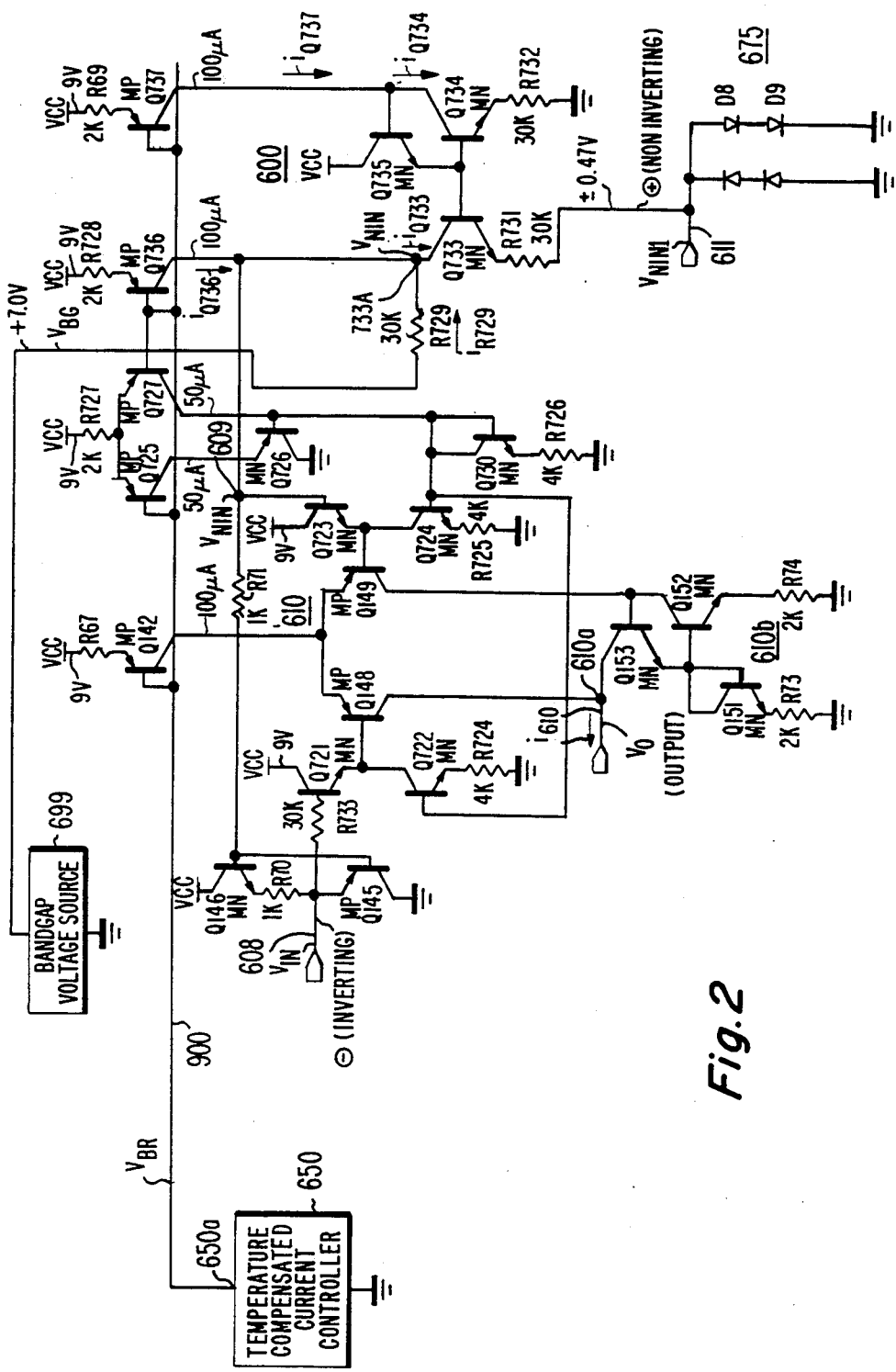
FIG. 2 illustrates a detailed schematic diagram of the level shifter of FIG. 1.

FIG. 2 illustrates a schematic diagram of level shifter 600 of FIG. 1 and of error amplifier 610. Similar numbers in FIGS. 1 and 2 represent similar items or functions. Level shifter 600 of FIG. 2 is temperature compensated over a wide range of ambient operating temperatures, such as between 0° C. and 70° C., to produce voltage $V_{NIN}$ that is substantially unaffected by a change in the temperature within such range.

A temperature compensated current control arrangement 650 generates a control voltage $V_{BR}$ on a rail signal line 900. Rail signal line 900 is coupled to the base electrode of each of transistors Q142, Q725, Q727, Q736 and Q737. The emitter electrodes of the above-mentioned transistors are coupled through corresponding resistors to a fixed DC voltage $V_{cc}$. Current control arrangement 650 controls voltage $V_{BR}$ in such a way that the collector current in each of the above-mentioned transistor stays substantially constant when the temperature changes. An example of an arrangement that is similar to current control arrangement 650 is described in detail in U.S. Pat. No. 3,886,435, in the name of S. A. Steckler, entitled VBE VOLTAGE SOURCE TEMPERATURE COMPENSATION NETWORK that is incorporated by reference herein.

Level shifter 600 includes transistors Q736 and Q737. The emitter currents in transistors Q736 and Q737 are controlled by resistors R728 and R69, respectively, having the same values that cause the respective collector currents of transistors Q736 and Q737 that are temperature compensated to be equal. The collector of transistor Q737 is coupled to a current mirror arrangement that includes transistors Q733, Q734 and Q735. The collector of transistor Q737 is coupled to the collector of transistor Q734. The emitter of transistor Q735 is coupled to each of the bases of transistors Q733 and Q734, respectively. Transistor Q735 provides the base current drive to each of transistors Q733 and Q734. The emitter of transistor Q734 is coupled to ground via a resistor R732. The P-N junction of transistor Q734 between the base and emitter electrodes of transistor Q734, provides temperature compensation that compensates for a temperature related variation of the base-emitter voltage of transistor Q733. The emitter of transistor Q733 is coupled to resistor R731 which is coupled to terminal 611, where voltage $V_{NIN1}$ of FIG. 1 is developed, via a resistor R731 that is equal to resistor R732. Voltage $V_{NIN1}$ is prevented from exceeding predetermined limits in either polarity by a diode network 675. The collector of transistor Q733 is coupled to the collector of transistor Q736 at a junction terminal 733A.

Assume that voltage $V_{NIN1}$ is zero. In this case, the current mirror arrangement of transistors Q733, Q734 and Q735, produces a collector current $i_{Q733}$ in transistor Q733 that is equal to a collector current $i_{Q734}$ in transistor Q734 because the base current of transistor Q735 is negligible. As explained before, when voltage $V_{NIN1}$ is zero, collector current $i_{Q736}$ in transistor Q736 is equal to collector current $i_{Q737}$ in transistor Q737 over a wide temperature range. Also, when voltage $V_{NIN1}$ is zero, each of collector current $i_{Q733}$ that is the current mirror of current $i_{Q734}$ is equal to current $i_{Q737}$ over such wide temperature range. It follows that current $i_{Q733}$ is also equal to current $i_{Q736}$.

Bandgap voltage source 699 supplies temperature compensated reference voltage $V_{BG}$ that is coupled via a resistor R729 to terminal 733A. Because, as described before, when voltage $V_{NIN1}$ is zero, current $i_{Q733}$ is supplied entirely by current $i_{Q736}$, and because the impedance at terminal 733A, that is contributed by the collectors of transistors Q733 and Q736 is high, a current $i_{R729}$ in resistor R729 is zero; therefore, voltage $V_{NIN}$ at terminal 733A is equal to voltage $v_{BG}$. Thus, in accordance with an aspect of the invention, when voltage $V_{NIN1}$ is zero, voltage $V_{NIN}$ is level shifted by an amount that is equal to voltage $V_{BG}$.

When voltage $V_{NIN1}$ at terminal 611 of FIG. 1 is different from zero, currents $i_{Q736}$ and $i_{Q737}$ will not be equal. The difference current between currents $i_{Q733}$ and $i_{Q736}$ will cause a voltage to develop across resistor R729 that, in turn, will cause a corresponding change in voltage $V_{NIN}$ at terminal 733A of FIG. 1. Because transistor Q733 of FIG. 2 is coupled, relative to voltage $V_{NIN1}$, as a common base amplifier, and because resistors R731 and R729 are, illustratively, equal, the gain, or the ratio between voltage $V_{NIN}$ and voltage $V_{NIN1}$, is one, resulting in an amplifier having a unity gain.

In carrying out another aspect of the invention, voltage $V_{NIN}$, that is level shifted relative to voltage $V_{NIN1}$ by an amount that is equal to voltage $V_{BG}$, follows variations of voltage $V_{NIN1}$ that occur in a range between positive and negative values.

Voltage $V_{BG}$ is temperature compensated and has a tolerance range that is narrow relative to, for example, a zener diode. Furthermore, component aging affects voltage $V_{BG}$ substantially less than it affects, for example, the breakdown voltage of a zener diode. Moreover, the level shifting caused by level shifter 600 is, advantageously, less susceptible to temperature, aging and noise when compared with that produced by a corresponding level shifter in the prior art that utilizes a zener diode interposed between a beam current input terminal and a noninverting input terminal of a differential amplifier to perform such level shifting.

Should a temperature change cause a corresponding change in current $i_{Q736}$, for example, that, as indicated before, would be relatively small, transistors Q737, Q733, Q734 and Q735 will cause a proportional change in current $i_{Q733}$ to occur that will prevent even such small change in temperature from affecting the difference current between currents $i_{Q736}$ and $i_{Q733}$. Therefore, when voltage $V_{NIN1}$ is zero, voltage $V_{NIN}$ is, advantageously, not affected by collector currents $i_{Q736}$ and $i_{Q737}$, but is entirely determined by voltage $V_{BG}$ that is temperature compensated.

It should be understood that temperature compensation may be adequate even when voltage $V_{NIN1}$ is significantly different from zero. If temperature compensation, in this case, is inadequate, a further improvement in temperature compensation may be obtained by coupling the terminal of, for example, resistor R732, that, in FIG. 2 is grounded, to a voltage that is different from zero and that is related to, for example, voltage $V_{NIN1}$.

Advantageously, voltage $V_{BG}$, as explained before, is maintained at tight tolerances, is temperature compensated and is substantially unaffected by components aging. Therefore, advantageously, no factory temperature burn-in process is required prior to the installment of regulator 100 of FIG. 1 in the television receiver. Furthermore, voltage divider 605 that includes resistors 601, 604 and 602 is required to compensate, advantageously, only for a narrower tolerance range than in a prior art circuit in which a zener diode is used for performing the level shifting function of level shifter 600 of FIG. 2.

Voltage $V_{IN}$ is coupled to the base of a transistor Q721. The clamping operation of a pair of transistors Q145 and Q146 prevents voltage $V_{IN}$ from being above voltage $V_{BG}$ or from being below voltage $V_{BG}$ by more than a predetermined magnitude. Voltage $V_{IN}$ is coupled to inverting input terminal 608 and voltage $V_{NIN}$ is coupled to noninverting input terminal 609 of error amplifier 610. Amplifier 610 includes a current source formed by a transistor Q142 that provides the combined emitter currents of a transistor Q148 and of a transistor Q149, coupled as a differential amplifier. The bases of transistors Q148 and Q149 are coupled to the emitters of transistors Q721 and Q723 respectively. Transistors Q721 and Q723 operate as emitter followers to couple voltages $V_{IN}$ and $V_{NIN}$ to the bases of transistors Q148 and Q149, respectively.

A current mirror arrangement 610b that is coupled to the collectors of transistors Q148 and Q149 causes a current $i_{610}$, coupled to integrating filter 612 of FIG. 1, to be equal to the difference between the collector currents in transistors Q148 and Q153. Consequently, current $i_{610}$ that is coupled to filter 612 of FIG. 1, is proportional to the difference between voltages $V_{IN}$ and $V_{NIN}$. The proportionality factor is determined by the gain of error amplifier 610.

FIGS. 3, 4, 5 and 6 illustrate level shifters 600a, 600b, 600c and 600d, respectively, embodying other aspects of the invention, respectively. In FIGS. 2-6, numbers and symbols of similar items or functions are similar except that they include the letters a, b, c and d, in FIGS. 3, 4, 5 and 6, respectively.

Figure 3:
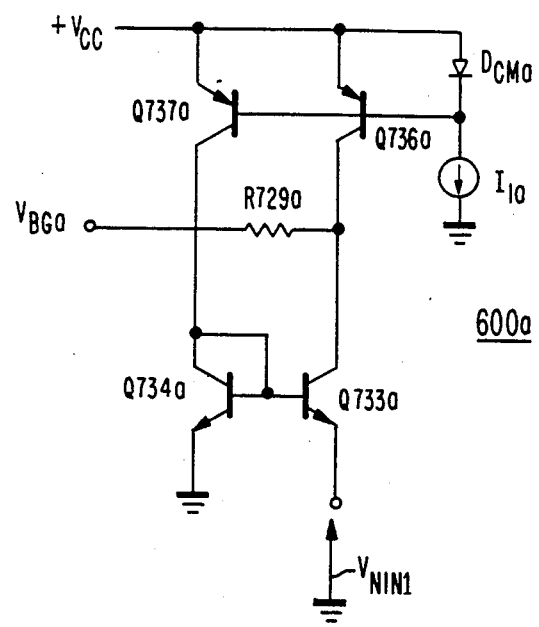
FIGS. 3, 4, 5 and 6 illustrate level shifters embodying different aspects of the invention, respectively.

In FIG. 3, resistors R731 and R732, that are used in the circuit of FIG. 2, were eliminated. Without resistors R731 and R732, the gain of amplifier 600a of FIG. 3 is, advantageously, higher than unity.

In FIG. 3, a diode $D_{cma}$ and a temperature compensated current source $I_{la}$ cause the collector currents in transistor Q737a and Q736a to be, for example, equal. Similarly, transistor Q734a causes the collector current in transistor Q733a to be, for example, equal to that in each of transistors Q737a and Q736a when voltage $V_{NIN1}$ is zero.

Figure 4:
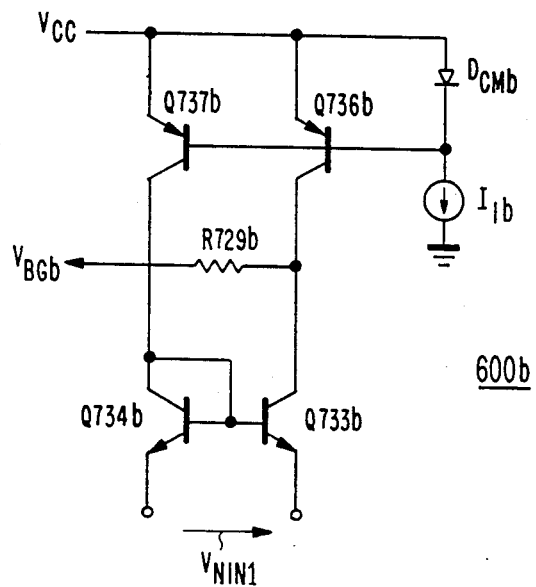

In FIG. 4, voltage $V_{NIN1b}$ is applied differentially between the emitters of transistors Q733b and Q734b. Such arrangement provides, advantageously, an improved common mode rejection.

Figure 5:
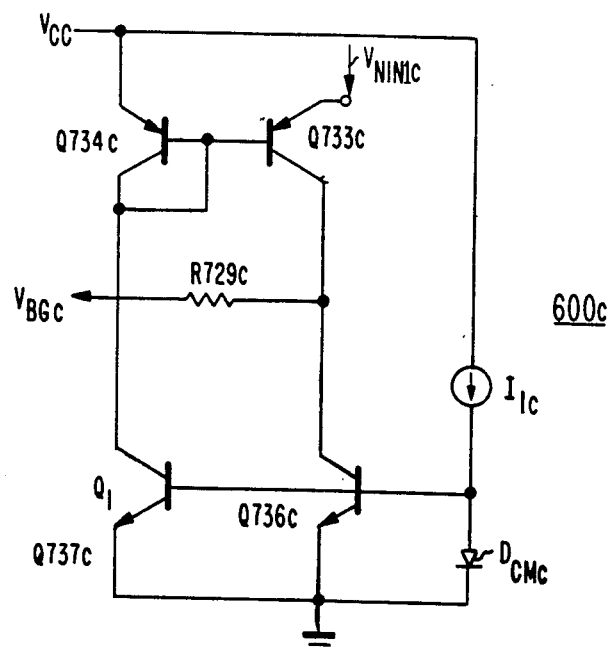

In FIG. 5 the type, N-P-N or P-N-P, of the corresponding transistors is opposite than that in FIG. 2 so that voltage VNIN1c may, if desired, be referenced to voltage $V_{cc}$, instead of to ground.

Figure 6:
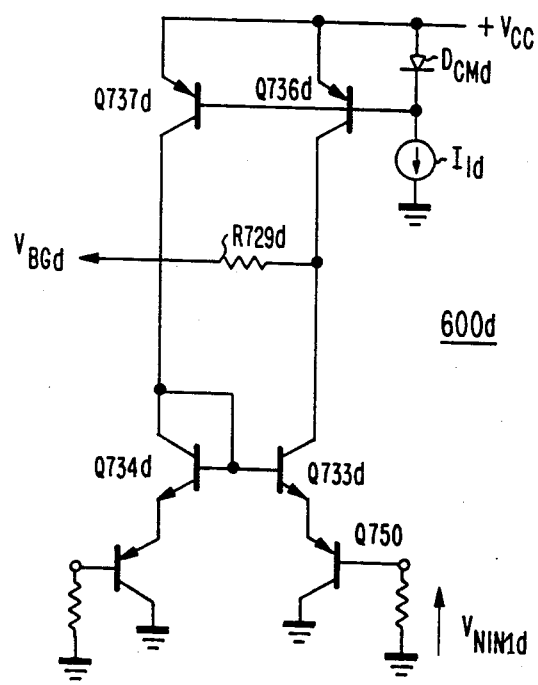

In FIG. 6, the input impedance to voltage $V_{NIN1d}$ is, advantageously, higher than to voltage $V_{NIN1}$ of FIG. 2 because of the usage of a transistor Q750 that is coupled as an emitter follower.

What is claimed is:

1. A power supply that includes a level shifter that level shifts an input voltage that controls an output voltage of said power supply, comprising:
    a source of supply voltage;
    a controllable conductive element coupled to said supply voltage for generating therefrom said output voltage;
    means, including a comparator, coupled to said conductive element for varying, in accordance with an output signal of said comparator, the conduction of said conductive element to control said output voltage;

a current mirror arrangement including a transistor and responsive to a current in a first circuit branch for generating a current in a first main current conducting electrode of said transistor that is the current mirror of said current in said first circuit branch, said first main current conducting electrode being coupled at a junction terminal to a second circuit branch for conducting at least a portion of a current in said second circuit branch;

a source of said input voltage coupled to said transistor for varying said current in said first main current conducting electrode to produce a current that varies in accordance with said input voltage and that is related to a difference between said current in said first main current conducting electrode and said current in said second circuit branch;

a first resistance coupled to said junction terminal for conducting said difference related current to develop a voltage thereacross that varies in accordance with said input voltage; and a source of temperature compensated first voltage coupled via said first resistance to said junction terminal such that said voltage across said resistance is combined with said first voltage for developing a temperature compensated second voltage at said junction terminal that varies in accordance with said input voltage and that is level shifted in accordance with said first voltage, said temperature compensated, level shifted, second voltage being coupled to an input of said comparator for varying said output signal of said comparator in accordance therewith to control said output voltage.

2. An apparatus according to claim 1 wherein said second circuit branch comprises a second transistor having a main current electrode that is coupled to said junction terminal and wherein said first circuit branch comprises a third transistor that generates, in a main current conducting electrode thereof, said current that is coupled to said current mirror arrangement such that said current mirror arrangement generates said current in said first main current conducting electrode of said first transistor at a level that is in accordance with said current in said third transistor.

3. An apparatus according to claim 2 further comprising a temperature compensated means coupled to corresponding control electrodes of each of said second and third transistors for generating said corresponding currents in said first and second circuit branches that remain substantially unchanged over said wide range of temperatures.

4. An apparatus according to claim 2 wherein said current mirror arrangement further includes a fourth transistor that is coupled to a control electrode of said first transistor and that is coupled in a path of said current in said third transistor to develop a voltage at said control electrode of said first transistor that causes said current in said first transistor to be the current mirror of said current in said fourth transistor.

5. An apparatus according to claim 4 wherein said input voltage is coupled between corresponding main current conducting electrodes of each of said first and fourth transistors for varying, in accordance with said input voltage, said currents in each of said first and fourth transistors.

6. An apparatus according to claim 2 further comprising, a second resistance, wherein said input voltage is coupled to an emitter electrode of said first transistor via said second resistance.

7. An apparatus according to claim 6 wherein said first transistor forms an amplifier having a gain that is determined by a ratio between said second and first resistances.

8. An apparatus according to claim 6 wherein said second resistance is substantially smaller than said first resistance such that said gain is higher than one.

9. An apparatus according to claim 6 further comprising a fourth transistor responsive to said input voltage and coupled as an emitter follower such that an emitter electrode of said fourth transistor is coupled to said emitter electrode of said first transistor.

10. An apparatus according to claim 2 wherein an impedance that is formed at said junction terminal by said first and second transistor is substantially higher than said first resistance.

11. An apparatus according to claim 1 wherein said source of said first voltage comprises a bandgap type voltage source.

12. An apparatus according to claim 1 wherein said current mirror arrangement maintains a ratio between said current in said first main current conducting electrode and said current in said second circuit branch unchanged over a wide range of temperatures.

13. A power supply according to claim 1 wherein said first voltage is developed at a first terminal of said resistance and said second voltage is developed at a second terminal of said resistance remote from said first terminal and wherein said second voltage comprises an algebraic sum of said first voltage and said voltage across said resistance.

14. A power supply according to claim 1 wherein a feedback voltage representative of said output voltage is coupled in a negative feedback manner to an input of said comparator for regulating said output voltage.

15. A power supply according to claim 14 further comprising, a deflection circuit coupled to said output voltage that provides a B+ energizing voltage thereto, wherein said feedback voltage is representative of said B+ energizing voltage.

16. A power supply according to claim 15 wherein said input voltage is representative of cathode ray tube beam current loading.

17. A power supply according to claim 15 wherein said temperature compensated, level shifted, second voltage is coupled to a noninverting input terminal of said comparator and said feedback voltage that is representative of said B+ energizing voltage is coupled to an inverting input terminal thereof.

18. A power supply according to claim 17 wherein said input voltage is representative of cathode ray tube beam current loading.

19. A power supply that includes a level shifter that level shifts an input voltage that controls an output voltage of said power supply, comprising:

a source of supply voltage;

a controllable conductive element coupled to said supply voltage for generating therefrom said output voltage;

means, including a comparator, coupled to said conductive element for varying, in accordance with an output signal of said comparator, the conduction of said conductive element to control said output voltage;

a first circuit branch;

means coupled to said first circuit branch for controlling a current that flows therein;

a transistor for generating a current in a first main current conducting electrode of said transistor that is in accordance with said current in said first circuit branch, said first main current conducting electrode being coupled at a junction terminal to said first circuit branch for conducting at least a portion of said current in said first circuit branch such that a ratio between said current in said first main current conducting electrode and said current in said first circuit branch remains unchanged over a wide range of temperatures;

a source of said input voltage coupled in series with a second main current conducting electrode of said transistor for varying said current in said first main current conducting electrode to produce a current that varies in accordance with said input voltage and that is related to a difference between said current in said first main current conducting electrode and said current in said second circuit branch;

a first resistance coupled to said junction terminal for conducting said difference related current to develop a voltage thereacross that varies in accordance with said input voltage; and a source of temperature compensated first voltage coupled via said first resistance to said junction terminal such that said voltage across said resistance is combined with said first voltage for developing a temperature compensated second voltage at said junction terminal that varies in accordance with said input voltage and that is level shifted in accordance with said first voltage, said temperature compensated, level shifted, second voltage being coupled to an input of said comparator for varying said output signal of said comparator in accordance therewith to control said output voltage.

* * * * *

UNITED STATES PATENT AND TRADEMARK OFFICE
CERTIFICATE OF CORRECTION

PATENT NO. : 4,714,871

DATED : December 22, 1987

INVENTOR(S) : Jack Craft et al.

It is certified that error appears in the above-identified patent and that said Letters Patent is hereby corrected as shown below:

Column 10, line 1, change "second" to read -- first --.

Signed and Sealed this

Fifth Day of January, 1993

Attest:

DOUGLAS B. COMER

Attesting Officer    Acting Commissioner of Patents and Trademarks